May 5, 1964 W. H. WOODWARD 3,132,254
PHOTO-ELECTRIC APPARATUS FOR DETECTING FLAWS IN MACHINE KNITTED MATERIAL
Filed Nov. 27, 1961
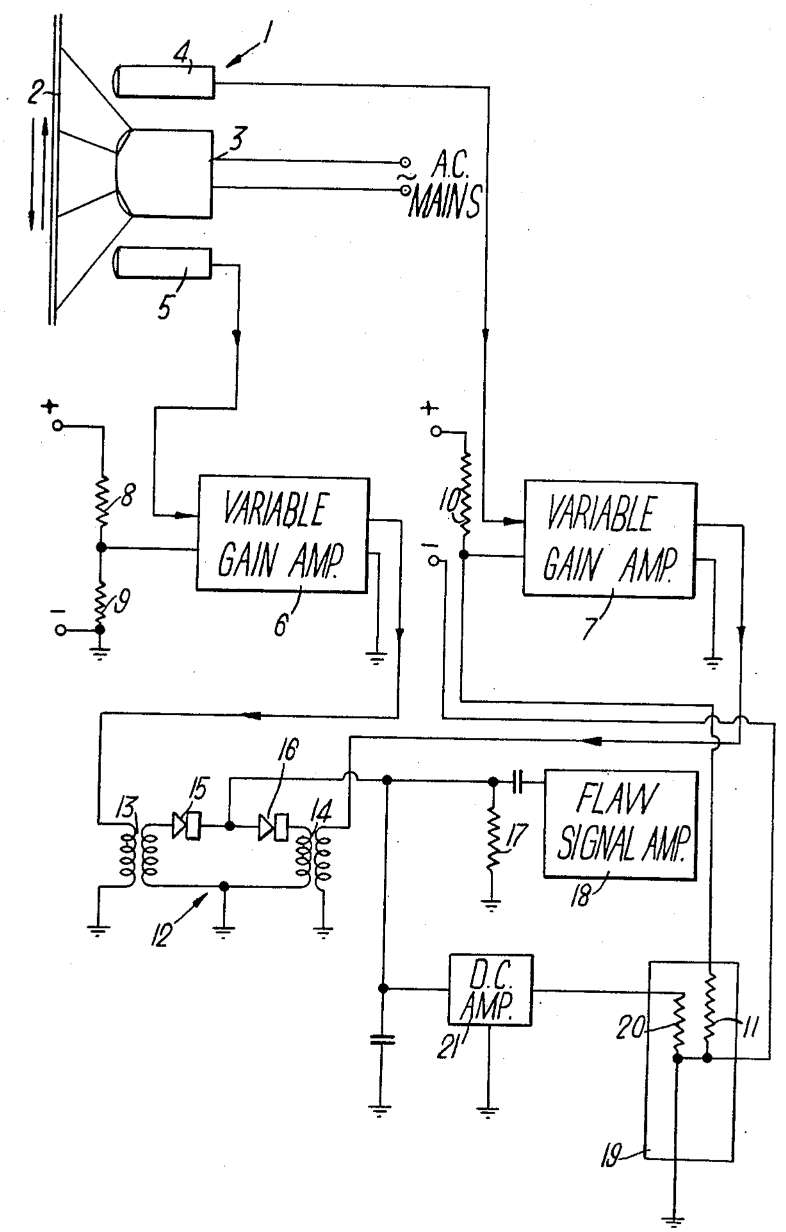
Inventor
William Henry Woodward
By Dowell & Dowell
Attorneys 3,132,254

PHOTO-ELECTRIC APPARATUS FOR DETECTING FLAWS IN MACHINE KNITTED MATERIAL

William Henry Woodward, 14 Bodmin Ave., Weeping Cross, Stafford, England

Filed Nov. 27, 1961, Ser. No. 155,057
4 Claims. (Cl. 250—219)

This invention relates to photo-electric apparatus for detecting flaws in knitted material for the purpose of giving warning, and/or automatically stopping a machine on which the material is being made, in the event of a fault in the fabric such as a ladder.

Such faults are difficult to detect because of the considerable degree of "flutter" due to vibration and other causes which produce spurious signals difficult to distinguish from the signal generated when the photo-electric head encounters a flaw in the fabric. A further difficulty arises from the fact that the characteristics of photo-electric devices and amplifiers do not remain constant throughout the working life of the devices but are subject to random changes due to various causes.

According to the present invention in order to overcome these difficulties, two photo-electric devices and amplifiers sensitive to changes in different portions of the fabric are employed in combination with a detecting device designed to respond to a difference in the outputs of the two amplifiers caused by a flaw in the fabric, and an automatic gain control which constantly tends to regulate the gain of one amplifier relative to that of the other so as to compensate for changes in the characteristics of the two amplifiers.

The invention will be fully understood from the following more detailed description with reference to the accompanying drawing which is a diagrammatic representation of the circuit arrangement of one embodiment of the invention.

The detecting apparatus has a head, generally indicated at 1 in the drawing, which is adapted to be removed so as to scan the fabric 2 in a direction at right-angles to the direction in which the material is fed by the action of the knitting machine. The head may be moved alternately back and forth across the width of the fabric as shown by the arrows, or it may be moved continuously in one direction so that it passes round and round the fabric.

The head 1 includes a lamp 3 arranged to produce two pools of light on the fabric spaced apart in the direction of travel of the head, and two photo-electric devices 4 and 5 arranged so that they scan the fabric one a short distance in front of the other.

The photo-electric devices 4 and 5 control the input of two variable-gain amplifiers 6 and 7 respectively. The amplifier 6 is associated with a voltage-divider composed of resistances 8 and 9, which delivers a gain-control voltage to the amplifier 6, and which is adjusted to set the gain of the amplifier 6 to a desired fixed value. The amplifier 7 is associated with a voltage divider, composed of resistors 10 and 11, which delivers a gain-control voltage to the amplifier 7 and which regulates the gain of the amplifier 7 automatically as hereinafter described.

The outputs of the two amplifiers 6 and 7 are oppositely coupled to a comparator indicated generally at 12 in the drawing so as to obtain an output from the comparator which is equal to the difference between the outputs of the amplifiers 6 and 7. In the example illustrated the comparator 12 comprises two transformers 13 and 14 having primary windings connected to the outputs of the amplifiers 6 and 7 and secondary windings connected through oppositely acting rectifiers 15 and 16 to a common load resistance 17 and thence to a flaw signal amplifier 18.

The resistor 11 forms the variable resistive element of a thermistor 19 having a resistance-heating element 20 connected to receive current from a D.C. amplifier 21 under the control of the output from the comparator 12. The element 20 is arranged to heat the resistor 11 so as to increase its resistance and thereby increase the gain of the amplifier 7 to an extent which depends on the output from the comparator 12.

The apparatus is initially adjusted so that the gain of the amplifier 7 is smaller than that of the amplifier 6 when the resistor element 11 is cold, the difference being sufficient to ensure that there is a substantial initial output from the comparator 12. The consequent output from the amplifier 21 heats the resistance-heating element 20 and thereby increases the gain of the amplifier 7. This reduces the difference between the outputs of the amplifiers 6 and 7 so bringing about a decrease in the output from the comparator 12. The effect is cumulative, and tends to reduce the difference between the outputs to zero.

The inherent delay in the response of the thermistor to variations in the control current enables the automatic gain control brought about by the action of the comparator 12 and amplifier 21 to compensate for variations in the characteristics of the two photo-electric devices and amplifiers without preventing the system from responding to the relatively sudden changes in the outputs of the two amplifiers that occur when the head 1 encounters a fault in the fabric 2.

The lamp 3 is supplied with alternating current from A.C. mains so as to produce a ripple in the light intensity having a frequency equal to twice the mains frequency. This provides the two amplifiers 6 and 7 with a constant input which produces a continuous signal sufficient to operate the automatic gain control in the absence of any other signal.

I claim:

1. Apparatus for detecting flaws in knitted material comprising two photo-electric devices sensitive to changes in different portions of the fabric each of said photo-electric devices being electrically connected to a variable gain amplifier, a detecting device arranged to respond to a difference in the outputs of the two amplifiers caused by a flaw in the fabric and an automatic gain control which constantly tends to regulate the gain of one amplifier relative to that of the other so as to compensate for changes in the characteristics of the two amplifiers said automatic gain control having a time delay element which renders said automatic gain control slow as compared with the response of said photo-electric devices caused by a flaw in the fabric.

2. Apparatus for detecting flaws in knitted material, comprising two photo-electric devices arranged to scan the the fabric one in front of the other, two amplifiers each arranged to amplify the output of one of said photo-electric devices, a control circuit including a thermistor arranged to vary the gain of one of said amplifiers in response to variations in the temperature of said thermistor, a comparator arranged to produce a differential output signal equal to the difference between the outputs of said two amplifiers, and means for supplying a heating current to a heating element of said thermistor the magnitude of which current depends upon the amplitude of said differential output signal whereby said thermistor is automatically adjusted to tend to reduce the difference between said outputs to zero, the operation of said thermistor being slow as compared with the response of said photo-electric devices and comparator to flaws in said fabric.

3. A device for detecting flaws as claimed in claim 2, including means for maintaining a continuous variation in the illumination of said material and thereby maintaining an output from said amplifiers sufficient to operate said thermistor in the absence of any other signal.

4. The apparatus of claim 1 wherein one of the amplifiers produces a smaller gain that of the other, by a predetermined amount, absent said automatic gain control.

References Cited in the file of this patent

UNITED STATES PATENTS

| | | |
|---|---|---|
| 2,559,587 | Black | July 10, 1951 |
| 2,566,399 | Bishop | Sept. 4, 1951 |
| 2,964,713 | Shepard | Dec. 13, 1960 |
| 2,972,794 | Saul et al. | Feb. 28, 1961 |